United States Patent [19]

Basso et al.

[11] Patent Number: 5,148,527

[45] Date of Patent: Sep. 15, 1992

[54] INTERFACE FOR INDEPENDENTLY ESTABLISHING A LINK AND TRANSMITTING HIGH LEVEL COMMANDS INCLUDING LOGICAL ADDRESSES FROM DEDICATED MICROPROCESSOR TO SHARED INTELLIGENT MEMORY

[75] Inventors: Claude Basso, Nice; Gerald Lebizay, Vence; Jean-Marie Munier, Cagnes Sur Mer; Andre Pauporte, La Colle sur Loup, all of France

[73] Assignee: International Business Machines Corporation, Armonk, N.Y.

[21] Appl. No.: 440,569

[22] Filed: Nov. 22, 1989

[30] Foreign Application Priority Data

Dec. 23, 1988 [EP] European Pat. Off. ........... 88480102

[51] Int. Cl.⁵ ..................... G06F 13/00; G06F 12/08
[52] U.S. Cl. ................... 395/325; 395/425; 364/228.1; 364/238.1; 364/931.4; 364/931.46; 364/935.2; 364/935.3; 364/961.4; 364/964.27; 364/DIG. 2
[58] Field of Search ... 364/200 MS File, 900 MS File; 395/325, 425

[56] References Cited

U.S. PATENT DOCUMENTS

| | | | |
|---|---|---|---|
| 3,718,005 | 1/1988 | Feigenbaum et al. | 364/200 |
| 4,074,254 | 2/1978 | Belser et al. | 364/900 |
| 4,694,396 | 9/1987 | Weisshaar et al. | 395/200 |
| 4,707,781 | 11/1987 | Sullivan et al. | 395/425 |
| 4,754,395 | 6/1988 | Weisshaar et al. | 364/200 |
| 4,890,226 | 12/1989 | Itoh | 364/200 |
| 5,014,192 | 5/1991 | Mansfield et al. | 364/200 |

FOREIGN PATENT DOCUMENTS

| | | |
|---|---|---|
| 0166268 | 1/1986 | European Pat. Off. |
| 0274413 | 7/1988 | European Pat. Off. |
| 8504499 | 10/1985 | World Int. Prop. O. |

OTHER PUBLICATIONS

Micrprocessing and Microprogramming, vol. 12, No. 3/4, Oct.-Nov. 1983, pp. 193-198, Amsterdam, NL; L. J. M. Nieuwenhius: "Mirtex: A Real-Time, Multi-tasking Executive for Microprocessors".

Primary Examiner—Thomas C. Lee
Assistant Examiner—Paul Harrity
Attorney, Agent, or Firm—Edward H. Duffield

[57] ABSTRACT

In a shared memory system, wherein several memory users MU wish access to a plurality of memory banks, a set of high level commands (CREATE, PUT, GET, RELEASE) is provided, to transfer data between a given memory user and the memory banks or another memory user. The high level commands sent by the memory users are built up by memory interfaces MI connected to the memory users, and transmitted through an interconnection network to Packet Memory Command Executors PMCE integrated into each memory bank. The high level commands work with data records identified by Logical Record Addresses (LRA) known by the memory users. During execution of the high level commands by the PMCE, the LRA are translated into physical addresses corresponding to physical address space in the memory banks. The physical address space is created dynamically and released upon need, through the Create or Release Commands.

A given memory user is not involved at all by management of physical address space, and works only with the LRA of a record.

7 Claims, 9 Drawing Sheets

ASID : ADDRESS SPACE IDENTIFIER (24 BITS)
.... : RESERVED FIELD

DDD..D : 9 BITS FOR CLASS 0 RECORDS
16 BITS FOR CLASS 1 RECORDS
23 BITS FOR CLASS 2 RECORDS

COMMAND FORMATS AND COMMAND RESPONSE FORMATS
1 BYTE COMMANDS      CMD RESPONSES
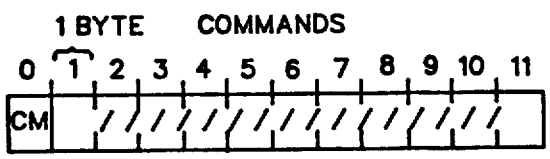
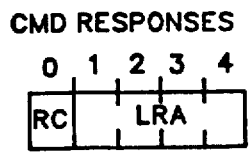
CREATE
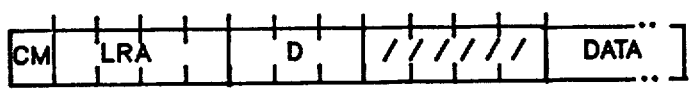
PUT
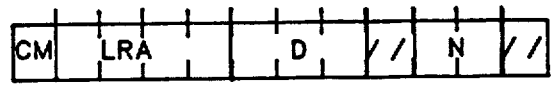
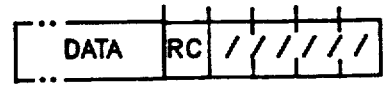
GET
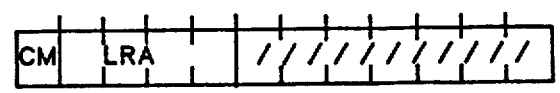
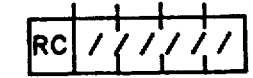
RELEASE
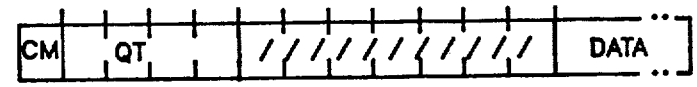
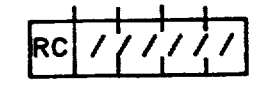
ENQUEUE
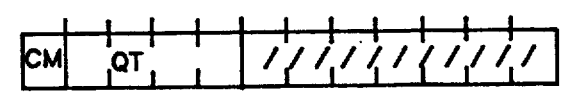
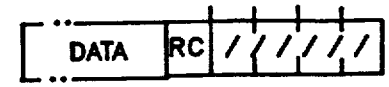
DEQUEUE
CM : MEMORY COMMAND CODE
LRA : LOGICAL RECORD ADDRESS
D : DISPLACEMENT
N : BYTE COUNT
/// : UNUSED
RC : RETURN CODE
RETURN CODE FORMAT: RRRR xxx (8 BITS)
    WHERE    RRRR = COMMAND RETURN CODE
                xxx = UNUSED
FIG. 4A

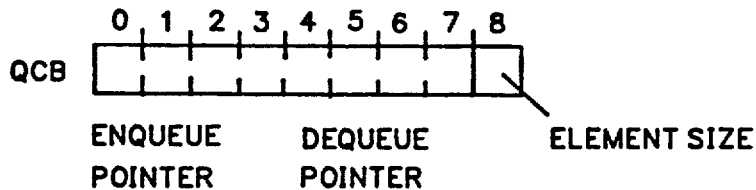

FIG. 4B

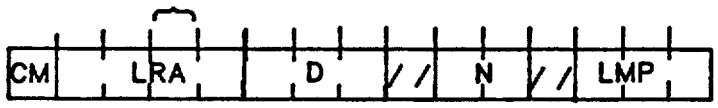

CM : COMMAND CODE
LRA : LOGICAL RECORD ADDRESS. UNUSED FOR THE CREATE COMMAND
D : DISPLACEMENT. UNUSED FOR CREATE AND RELEASE COMMANDS
N : DATA BYTE COUNT. USED FOR THE GET COMMAND ONLY
LMP : LOCAL MEMORY POINTER. USED FOR THE GET AND PUT COMMANDS POINTS TO THE COME-FROM OR GO-TO DATA AREA IN THE MEMORY USER LOCAL MEMORY

MSW

CC : COMMAND COMPLETION CODE
LRA : USED IN THE CREATE COMMAND TO RETURN THE LOGICAL RECORD ADDRESS TO THE MEMORY USER

FIG. 5

INTERFACE FOR INDEPENDENTLY ESTABLISHING A LINK AND TRANSMITTING HIGH LEVEL COMMANDS INCLUDING LOGICAL ADDRESSES FROM DEDICATED MICROPROCESSOR TO SHARED INTELLIGENT MEMORY

FIELD OF THE INVENTION

The present invention relates to systems where multiple processors or users have access to a common memory, or to a shared memory consisting of a plurality of memory modules (memory banks) which are separately accessible, and in particular to a shared intelligent memory which is able to dynamically allocate memory space to multiple processors or users.

BACKGROUND—PRIOR ART

For systems having a plurality of shared resources such as memories, I/O devices, buffers, etc. . . . , it is of interest to provide a concurrent access to said shared resources, and preferably in a transparent manner for the users or multiprocessors, versus the physical system configuration.

A shared memory computer apparatus providing concurrent access to a plurality of users, has been described in European patent 0023213-B1.

The problem addressed therein consists in providing conflict-free access to shared memory modules, without loss of performance when the number of accesses and the number of memory modules are increased. To reach this result, means are provided, in the form of a random address generator connected for receiving the access requests and for translating addresses received with said request into randomly distributed addresses with respect to the memory units.

However, this prior art system does not provide a sufficient transparency to the users versus the actual, or physical addresses of information within the memory modules, since said prior art system only uses logical addressing for address randomization purposes. Besides, the commands used by the processor to accede to the shared memory are conventional Write, Read or Test commands, and the memory record are not dynamically expendable.

OBJECTS OF THE INVENTION

Therefore, it is an object of the invention to devise an improved shared intelligent memory allowing simple and flexible memory access in a multiprocessor environment, in a manner that allows the users or multiprocessors to communicate through the shared memory, with an optimized level of transparency versus the physical location of information in the memory.

It is another object of the invention to provide an improved means for resolving the space management problem within the shared memory, the memory space being allocated automatically upon need by the users.

It is a further object of the invention to provide the users or processors with a set of high level commands for acceding to the shared memory, each user seeing the shared memory as a logically centralized facility, even if the associated hardware is physically distributed.

BRIEF SUMMARY OF THE INVENTION

These objects are achieved by the shared intelligent memory as defined in claim 1.

According to the invention, means are provided to interconnect multiple processors into a multiprocessor complex, through a shared memory, called Packet Memory (PM) in the rest of the specification.

A plurality of Memory Users (MU) share records within the PM. The PM may be constituted by a single storage unit, or preferably, as assumed in the specification, by a plurality of independent memory banks (MB). To communicate with each other, the MUs exchange messages using queues of records located in the PM, via appropriate commands.

For each MU, a decentralized Memory interface (MI) is provided. It consists of a logic layer allowing the presentation of high level commands issued by the MU, to the Memory banks.

A high level command (PUT, GET . . . ) directed to a MB is executed in the MB by a Packet Memory Command Executor (PMCE) preferably integrated in each MB.

Thus, while the user's view of the PM is that of a logically centralized facility working on records, all defined by logical addresses (e.g. Logical Record Addresses, LRA), the associated hardware can be physically distributed, providing granularity in terms of performance, capacity and cost.

The PM according to the invention also resolves the space management problem, in that records, constituted by a plurality of chained buffers within a MB, are dynamically created (and associated memory space allocated) by the PMCE and released on demand by a MU.

Given the structure of the PM according to the invention, it is of interest to balance the load or utilization of the MBs by the MUs. This problem, is independent of the one solved in the present application.

Further features and advantages of the invention will become apparent from the following detailed description of a preferred embodiment in connection with the accompanying drawings.

BRIEF DESCRIPTION OF THE DRAWINGS

FIG. 4A shows the formats of the commands and command responses which are used for storage operations in the system of FIG. 1.

FIG. 4B shows the format of a Queue Control Block used in some of the commands shown in FIG. 4A.

FIG. 5 shows the formats of memory control blocks which are stored in the user's local memory and are used for information transfer between the user and its memory interface.

DETAILED DESCRIPTION OF THE PREFERRED EMBODIMENT

1. System Overview

Figure 1:
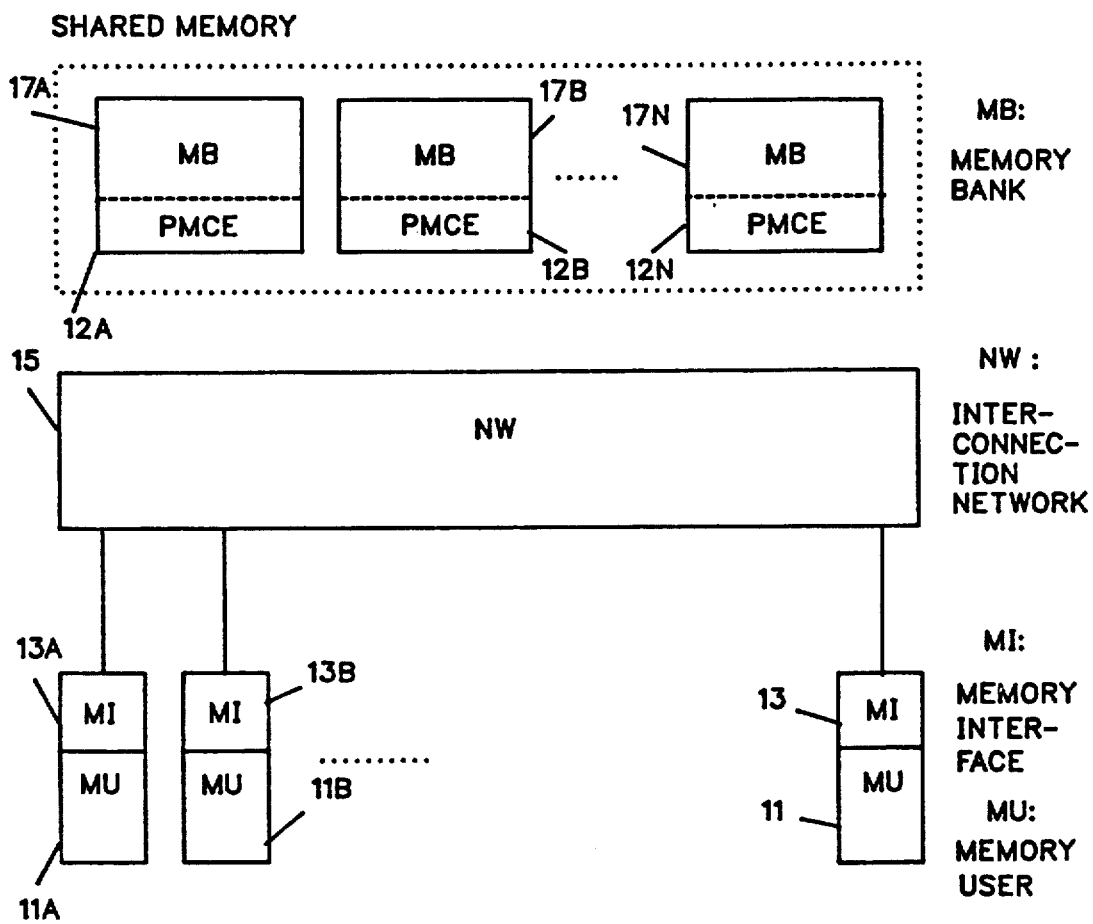
FIG. 1 is a block diagram of the overall configuration of a multiple user system with shared storage in which the invention is used.

FIG. 1 shows the configuration of a system in which present invention finds application. In principle, it is a system in which multiple users are connected to multiple memory banks (memory modules) which function as common (or shared) memory for the whole set of users. Such arrangement is used, e.g., in communication controllers, wherein present application would find advantageous application.

Each memory user MU (11A, 11B, ... 11N) is connected through its own memory interface MI (13A, 13B, ... 13N) to a common interconnection network NW (15). The memory banks MB (17A, 17B, ... 17N) are equal units which are individually connected to the interconnection network.

In a less advantageous implementation of the invention, all the memory banks MB (17A, 17B, ... 17N) could be grouped within a single shared memory shown by dotted line (10), but this solution would be worse from a reliability stand point, and will no longer be considered in the application. The same remark can be made for the partitioned memory interface MI (13A, 13B, ..., 13N) versus a single memory interface. FIG. 1 further shows a Packet memory Command Executor PMCE (12A, 12B, ..., 12N) integrated in each memory bank, for the execution of the high level commands presented by the memory users. Its structure will be described later on.

The interconnection network is a multiple port packet switch which, in response to data packets entered at one of its ports, can route said data packets to the required output port. Such networks are known and are described e.g. in the following publications, and in the literature cited therein. T. Feng: "A Survey of Interconnection Networks"; Computer (IEEE), December 1981, pp. 12-30. V. P. Kumar et al: "Augmented Shuffle-Exchange Multistage Interconnection networks"; Computer (IEEE) June 1987, pp. 30-40.

Figure 2:
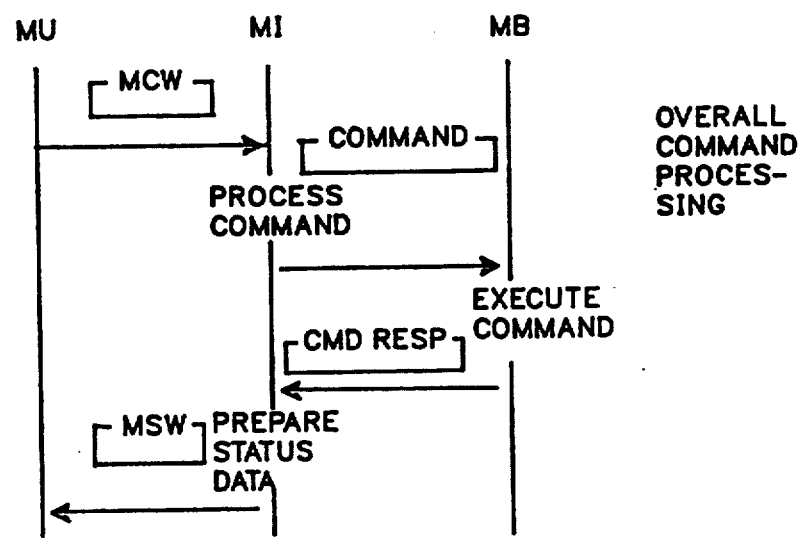
FIG. 2 is a schematic representation of the information flow and sequence of steps for a memory access in the system of FIG. 1.

The advantage of the whole arrangement is that it can be modularly expanded (as long as the interconnection network is of sufficient capacity and has enough ports). The number of memory banks can be adapted to the number of users and to the storage requirements they have. Without limitation of the scope of the invention, it will be assumed herein that the number of memory banks is N=8. The overall flow of commands and control information for memory accesses is schematically shown in the diagram of FIG. 2.

The memory user MU prepares a memory control word MCW specifying the desired operation and containing parameters. The MCW is transferred to the memory interface MI which processes the command request and sends a command to one of the memory banks MB. The command is executed by the PMCE of the MB (storing of data, reading of data, etc.) and a command response is returned to the MI. The MI prepares status data reflecting the response received from the MB and possibly additional status data reflecting how the memory operation was completed, and these status data are transferred in a memory status word MSW to the MU.

The term "command" as used in the following description actually designates a request for a memory high level operation, which is sent from a Memory user/Memory Interface to a Memory Bank (such as Create, Put/Get, Release, Enqueue, Dequeue), and fundamentally differs from the well-known memory read-write operations.

The formats of the commands and command responses, of the MCW and of the MSW are detailed later in connection with FIGS. 4 and 5.

The command processing (e.g. presentation, formatting) is done by a logic layer (in the MI) which downwards, has an interface to the memory user MU allowing read/write access to the MU local memory, and upwards, has another interface to the interconnection network NW. Details of the MI logic and its operation will be described later in connection with FIGS. 6 and 7.

It is to be noted that one principle assumed for the present system is that the distribution of user data among the storage banks is arbitrary, i.e. there is no fixed association or preassignment between memory banks and users, the physical memory assignment being transparent for the latter. But one problem arising form this principle is that the memory banks may be utilized (loaded) unevenly. Thus, a few memory banks may be completely filled with data while others are not used at all. This may result in congestion, unnecessary waiting times, and loss of parallelism which could be avoided as long as the total memory space available is sufficient for all the data to be stored.

2. Packet Memory Principles of Operation

The data objects included in the packet memory, and the high level commands working with said objects, will now be described.

The packet memory contains two types of data objects: Records (R) and Queues (Q).

The records are named areas of memory with addressable contents which are created, cancelled, written into and read out by the users via a set of commands that will be detailed later.

A record is identified by a Logical Record Address (LRA) which is allocated by a memory user at the creation of the record. Physical address space is allocated to the LRA in a way described in relation to FIG. 11A. A data byte is localized within a record by a Displacement D. The content of a record is managed by its owner; there is nothing in the PM which helps figuring out what and where are the data inside it. Non written areas of the record have unpredictable contents.

In a particular embodiment of the invention, there are 3 classes of records which differ in capacity, access time and space requirement. Class 0 records can contain up to 512 bytes, have the shortest access time and smallest space requirement; class 1 records can contain up to 64K bytes and have intermediate access time and space requirement; class 2 records can have up to 8 Mbytes and have the worst access time and space requirement. The class of the record is specified by the user when creating it. This does not mean that the records are from the beginning 512 bytes, 64K bytes or 8 Mbytes areas of memory. Memory space is allocated on a need basis as data are filled into the records.

Given a record, the user sees a linear succession of logical addresses specified by the displacement D representing the logical address of a byte of a physical data buffer, having for instance a fixed size of 512 bytes. Thus, hidden to the user, the records are made up of buffers (for instance of 512 bytes each), assembled together according to a scheme which is described in relation to FIG. 10.

The records are used to store transient data (i.e. data which have a short life) or to implement system functions such as TP packet switching, but also to store permanent data such as routing tables, control blocks, etc. . . .

Figure 3A:
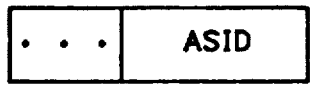
FIG. 3A shows the format of a Logical Record Address (LRA).

The Logical Record Address (LRA) is a 4 bytes logical name which uniquely identifies a record within the Packet Memory. Its format is shown in FIG. 3A.

A subfield exists in the ASID (Address Space Identifier) to identify the physical PM Bank which contains the record. It is used by the Memory interface MI to select the appropriate bank.

Figure 3B:
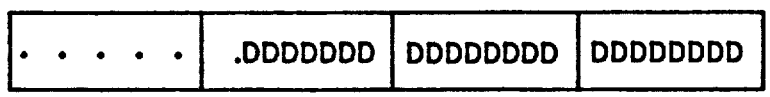
FIG. 3B shows the format of the Displacement D in a record.

The displacement D locates a data byte within a record. Its format is shown in FIG. 3B. Of course, the longer a record can be (according to its class), the more bits are needed to define the displacement D.

The queues as referred to above, are built over records and, as a consequence, have the same attributes as them: name, maximum size. They are composed of fixed size elements of 8, 16, 32, 64, 128 or 256 bytes. The element size is defined at queue creation. The queue size is limited by the record size. In this specification, we refer to a queue by a queue token QT which, in fact is the Logical Record Address LRA of the underlying record.

The access to the queues is FIFO and made via the ENQ and DEQ commands, used especially during task to task communication, and described later.

To create a queue, the underlying record has to be created and a queue control block (QCB) has to be written in it with the initial values of the enqueue, dequeue pointers and the value corresponding to the size of the queued elements. If a MU wants to know the current number of elements in a queue, it can read its queue control block via a GET command. A queue is released by releasing the underlying record, by a RELEASE command, explained later.

The QCB format is shown in FIG. 4B. It contains an Enqueue Pointer E, the address of which represents four bytes, a Dequeue Pointer D, having also a four bytes address, and the size of each element used in the queue (8, 16, 32, 64, 128, 256 bytes), said size choice being specified by one byte maximum.

Figure 8:
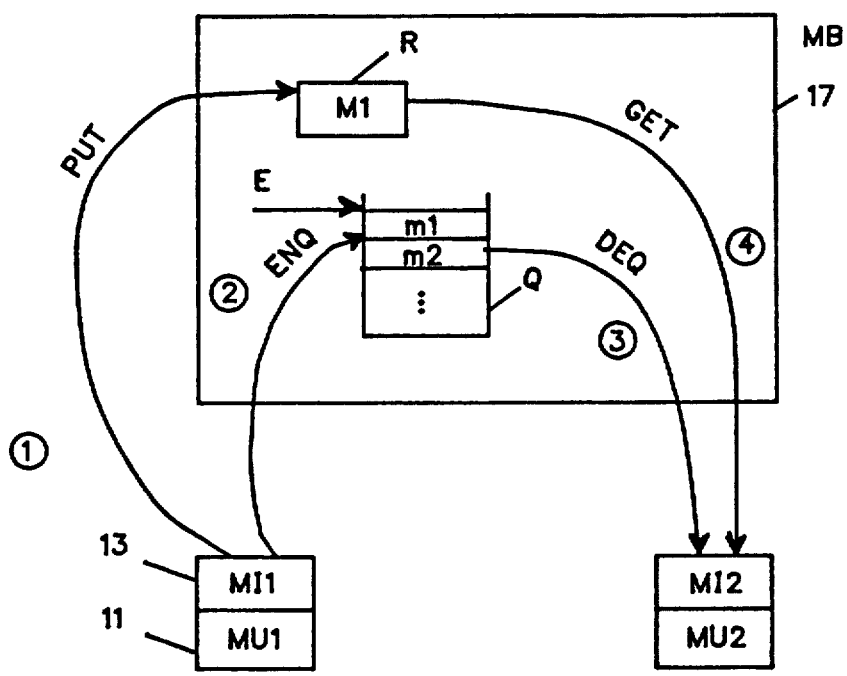
FIG. 8 shows a schematic representation of the principle of operation of an ENQUEUE or DEQUEUE command.

The use of the ENQ and DEQ command is best understood in relation with FIG. 8. This figure represents the situation where a first memory user MU1 wants to communicate a message M1 to a second memory user MU2 connected to the same memory bank MB (17) through the interconnection network (not shown).

Therefore, the MU1 puts the message M1 in a record (R) within the MB, using a PUT command (Step 1). But at this stage, the MU2 can not know the reference of the logical record address where message M1 is kept within MB, so it is necessary that MU1 himself gives this indication to MU2, through the ENQ command (step 2). This command causes the enqueuing of a fixed size element m1 into a Queue Q, at a place pointed at by an enqueue pointer E.

Figure 9:
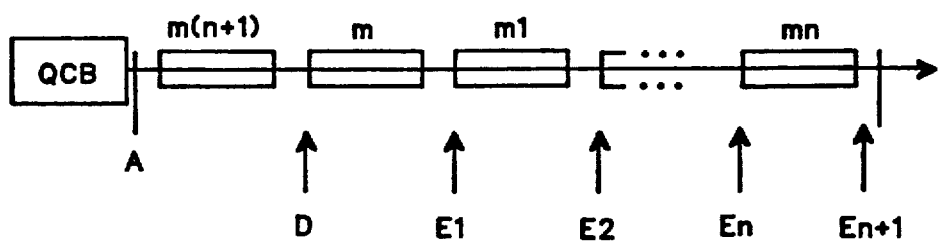
FIG. 9 shows a schematic representation of a queue on which the ENQUEUE/DEQUEUE commands of FIG. 8 are performed.

It is to be noted that if other messages M2, M3, . . . are transmitted by MU1 to the MB, the corresponding queue elements m2, m3 will be enqueued (and later dequeued) on a FIFO basis, and the Enq pointer is accordingly displaced as shown in FIG. 9.

When MU2 checks the content of the Queue Q (through a conventional polling method for instance), it will dequeue the queue element m1 (step 3), giving the logical address of the message record M1. Then (step 4), a GET command performed by MU2 will allow him to read the whole record M1.

This previously described communication scheme between the memory users MU1 or MU2 is particularly appropriate for task to task communication between said Memory users.

It is also to be noted that since the ENQ/DEQ commands are FIFO with respect to the queue elements m1, m2, . . . , there is no displacement to be specified by said ENQ/DEQ commands.

FIG. 9 further shows the structure of a Queue, comprising a queue control block QCB, and a determined logical address space (A,B) corresponding to the size of the total logical record addresses (m1, m2, . . . of the queued records or messages M1, M2, . . .

The successive positions E1, E2, . . . En of the enqueue pointer E are shown, as well as the corresponding queue elements m1, m2, . . . mn successively enqueued.

A Dequeue command causes the deletion of the queue element m located after the DEQ pointer D. Since the address space of the queue is limited by (A,B), when the Enq. pointer E reaches position $E_{n+1}$, the queue element m(n+1) enqueued is put on top of the queue, just after position A.

It is to be noted that in case more Dequeue than Enqueue commands are performed over a period of time, the Deq. pointer D can reach the current position of the Enq pointer E, which means that the queue is empty, apart the minimum content constituted by the QCB.

Of course, the positions of the E and D pointers are only known to the Packet Memory Command Executor and not to the Memory Users, for whom the Enq/Deq commands are transparent, like the CREATE/PUT/-GET/RELEASE high level commands.

It is finally to be noted that since the record underlying a queue grows on a need basis, it is the same for the size of the queues, which depends on the number of messages to be transmitted between memory users.

Besides, it is interesting to notice that the ENQ/DEQ commands are also high level commands, using even more elaborate steps than the basic CREATE/PUT/-GET/RELEASE commands, the formats of which will be described below.

3. Memory Interface Functions and Command Formats

The function of the memory interface MI is to provide a standard decentralized memory interface to each memory user MU. It handles the memory commands which are presented by the memory user MU as follows. It selects the appropriate memory bank MB (using a load balancing technique for instance), sets up a connection to that MB through the interconnection network NW, builds and sends a command (which may also include data) over that connection, waits for a command response (which in certain cases also includes data from the MB), releases the connection and generates completion status data for the memory user MU.

Each command is composed of a 12-byte header (shown in FIG. 4A) followed by an optional data field. Each command response is composed of an optional data field followed by a 5-byte trailer.

The commands may be preceded by a starting delimiter (SD) and followed by a end of command delimiter (EOC), not shown.

A total of six different memory commands and associated command responses are provided, and they are briefly described in the following, being understood that their implementation by the PMCE will be described later in relation to FIGS. 10 and 11.

CREATE (format: Cmd only)

This command issued by a given MU causes creation of a RECORD (a logical unit of storage) in the shared memory and the assignment of a Logical Record Address (LRA) to it. The LRA is a system unique reference which allows to retrieve a memory record in the shared memory.

No memory space is allocated to a new record by this command (as long as no data are to be stored yet).

The command response returns the LRA to the respective memory interface MI.

PUT (format: Cmd, LRA, D, data)

The PUT command causes the data it carries with it to be written into a record specified by its LRA, at the specified displacement D. Enough memory space is dynamically allocated to the record (when the PUT command is executed) so that the data can be stored.

The command response carries no specific data back to the memory interface MI (except for the Return Code RC contained in each command response).

GET (format: Cmd, LRA, D, N)

The GET command causes reading of N data bytes from a record specified by its (LRA), at the specified displacement D.

The command response carries the N data bytes back from the memory bank to the memory interface MI.

RELEASE (format: Cmd, LRA)

The RELEASE command causes cancelling of the record specified by LRA and releasing of the associated memory space of the MB.

The command response contains no specific data (except for the Return Code).

Return Code Structure and Load Status Indicator:

The Return Code (RC) which is part of each command response returned by a memory bank is an 8-bit byte which has the following structure: The first four bits RRRR are a specific code which indicates the completion status of the respective memory command.

The remaining bits are free or can be used as indicators for the load status of a given memory bank.

ENQ(QT,data)

The effects of this high level command has been described in relation to FIGS. 8, 9. QT designates a queue token, which is in fact the Logical Record Address of the record on which the queue is built.

The ENQ command comprises several steps, themselves constituted of GET and PUT commands performed by the PMCE. As a consequence, the PMCE cannot be disturbed during execution of said command, by a PUT or GET command performed by a memory user MU. The steps of an ENQ command are the following:

1. The PMCE generates a GET command, wherein LRA is equal to the queue token QT, and the specified displacement corresponds to the displacement of the E pointer within the QCB.

2. The PMCE generates a PUT command, wherein LRA is equal to QT, D is equal to displacement of E in the QCB, and the data to be PUT are the queue elements (m1, m2, ... ) to be enqueued.

3. The PMCE performs a PUT command wherein LRA=QT, D=displacement of E in QCB, and data=E+32 (if 32 is the size of a queue element), this causes updating of the Enqueue pointer E after enqueue command.

DEQ (QT)

This command is used to dequeue an element m from a queue. It is also a high level command, using GET, PUT commands, as summarized below with their parameters:

1. GET (LRA=QT; D=0, N=9): causes a Read of the whole QCB.
2. GET (LRA=QT; D=displacement of Deq. PTER; N=32)
3. PUT (LRA=QT; D=displacement of Deq. PTR; D+32
4. Release of one buffer of memory space: the one which contained the element which was just dequeued.

4. Memory User and Memory Control Blocks

Figure 6:
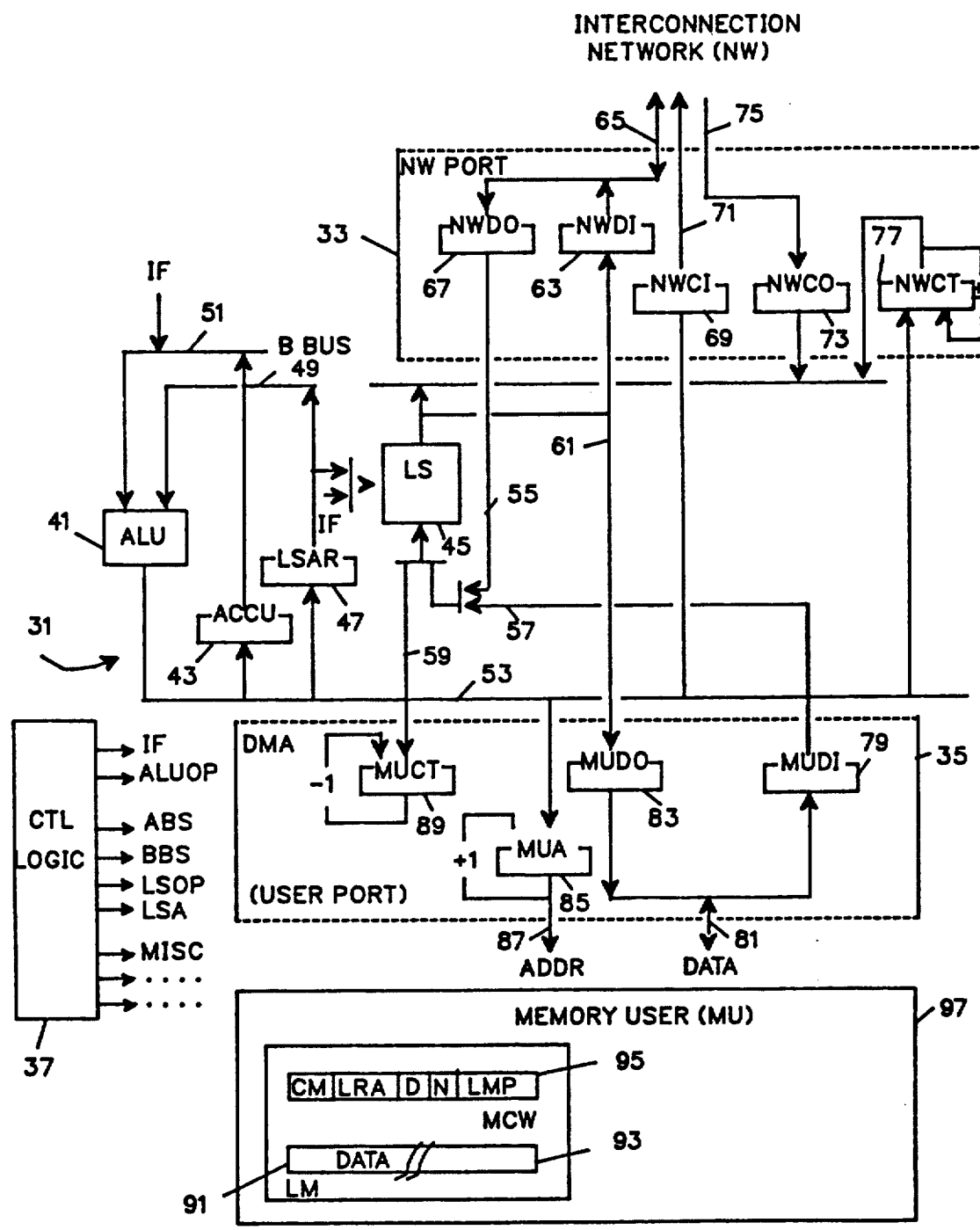
FIG. 6 is a block diagram of the memory interface (MI) interconnecting a user and the shared memory in the system of FIG. 1.

The memory user MU can be viewed as a microprocessor with its main store which is called the MU local memory LM (91), shown in FIG. 6. The memory commands move data between the shared memory (the total set of all memory banks MB) and the MU local memory (91).

Information exchange between a memory user MU and its memory interface MI is effected through memory control blocks the formats of which are shown in FIG. 5.

A memory command is presented by the memory user MU as a control block that is called "Memory Command Word" (MCW) and is set up in the local memory of the memory user MU. The MCW contains control information specifying the type of the memory command (create, get, ... ), the Logical Record Address (LRA), the data displacement (D) within the record, the data count (N), and the address of the data area within the MU local memory (local memory pointer LMP).

The completion status data is presented by the memory interface MI to the memory user MU as a control block in the MU local memory: the "Memory Status Word" (MSW). The status data contain information (CC) about whether the command execution was satisfactory or not. In the case of a create command, the MSW also contains the Logical Record Address LRA of the created record.

5. Memory Interface Logic

A block diagram of the memory interface logic is shown in FIG. 6. Its elements and structure are as follows:

The MI basically comprises a central portion 31, an interconnect network (NW) port 33, a DMA portion or user port 35, and a control section 37.

The central portion 31 includes an ALU 41, an accumulator register (ACCU) 43, local storage LS 45 and local storage address register LSAR 47. An A bus 49 and B bus 51 are connected to the inputs of the ALU, and a result bus 53 is connected to the output of the ALU. Input data to the LS are transferred on lines 55, 57, and 59, and output data from the LS are transferred on line 61.

NW port 33 comprises four registers and a counter. NW Data In (NWDI) register 63 is connected between LS output line 61 and a two-way NW data bus 65. NW Data Out (NWDO) register 67 is connected between LS data input line 55 and the NW data bus 65. NW Control In (NWCI) register 69 is connected between ALU result bus 53 and a NW control input line 71. NW Control Out (NWCO) register 73 is connected between A bus 49 and a NW output control line 75. A NW Counter (NWCT) 77 receives its input from ALU result bus 53. Its content can be incremented (or decremented) by one unit when a byte was received from (or furnished to) the network, and it can be tested for zero.

User port 35 includes three registers and a counter. MU Data IN (MUDI) register 79 is connected between LS input line 57 and a two-way user data bus 81. MU Data Out (MUDO) register 83 is connected between LS output line 61 and the user data bus 81. MU Address (MUA) register 85 is connected between ALU output bus 53 and a user address line 87. A MU counter (MUCT) 89 receives its input from ALU result bus 53. The content can be decreased by one unit when a byte was received from (or furnished to) the user, and it can be tested for zero.

Control section 37 furnishes the following data or control signals:

IF = Immediate Field (LS Operand or LS Address)
ALUOP = ALU Operation code (Add, Subtract, And, Or, Xor, Rotate, ... )
ABS = A Bus Source
BBS = B Bus Source
LSOP = LS Operation code (Read, Write, NOOP)
LSA = LS Address Control
MISC = Miscellaneous controls to write registers, start DMA, etc.

The MI logic has the following capabilities:

1) The MI Logic can perform arithmetic and boolean operations on two operands, one being an immediate value (IF) generated by the control section, and the second one being the contents of a LS location or of a control register.

2) The MI logic has read/write access to the MU local memory LM(91), the local memory address and the byte count being respectively specified in the MU Address Register (MUA) and the MU Count Register (MUCT). The source of the data during write (or the destination during read) is the LS addressed by the LS address Register (LSAR).

3) The MI logic can establish a connection to a memory bank MB through the interconnection network NW by loading a connection request and the MB address (identifier) into the "NW Control In Register" (NWCI) and waiting for a connection grant to be returned in the "NW Control Out Register" (NWCO). The connection can be released in a similar way by loading a connection release request into the NWCI and waiting for a grant to be returned in the NWCO. The interconnection network NW will not be further described as it is not the subject of present invention (Publications describing interconnection networks have been mentioned in section 1 above). Once the connection is established to a memory bank MB, the MI logic can make a two way data transfer over that connection: assuming the LSAR is initialized to value A and the NW Count Register (NWCT) to value N, the N bytes located at LS(A) are read out and sent to the MB. This inbound data transfer terminates with NWCT = 0 and LSAR = A + N. The MB is then supposed to return a string of bytes which are received and stored into the LS starting at address A + N. The number of received bytes is available in the NWCT at the completion of the outbound transfer. The commands and command responses are exchanged between the memory interface MI and a memory bank MB in that way.

6. Command Processing by the Memory Interface Logic

Figure 7:
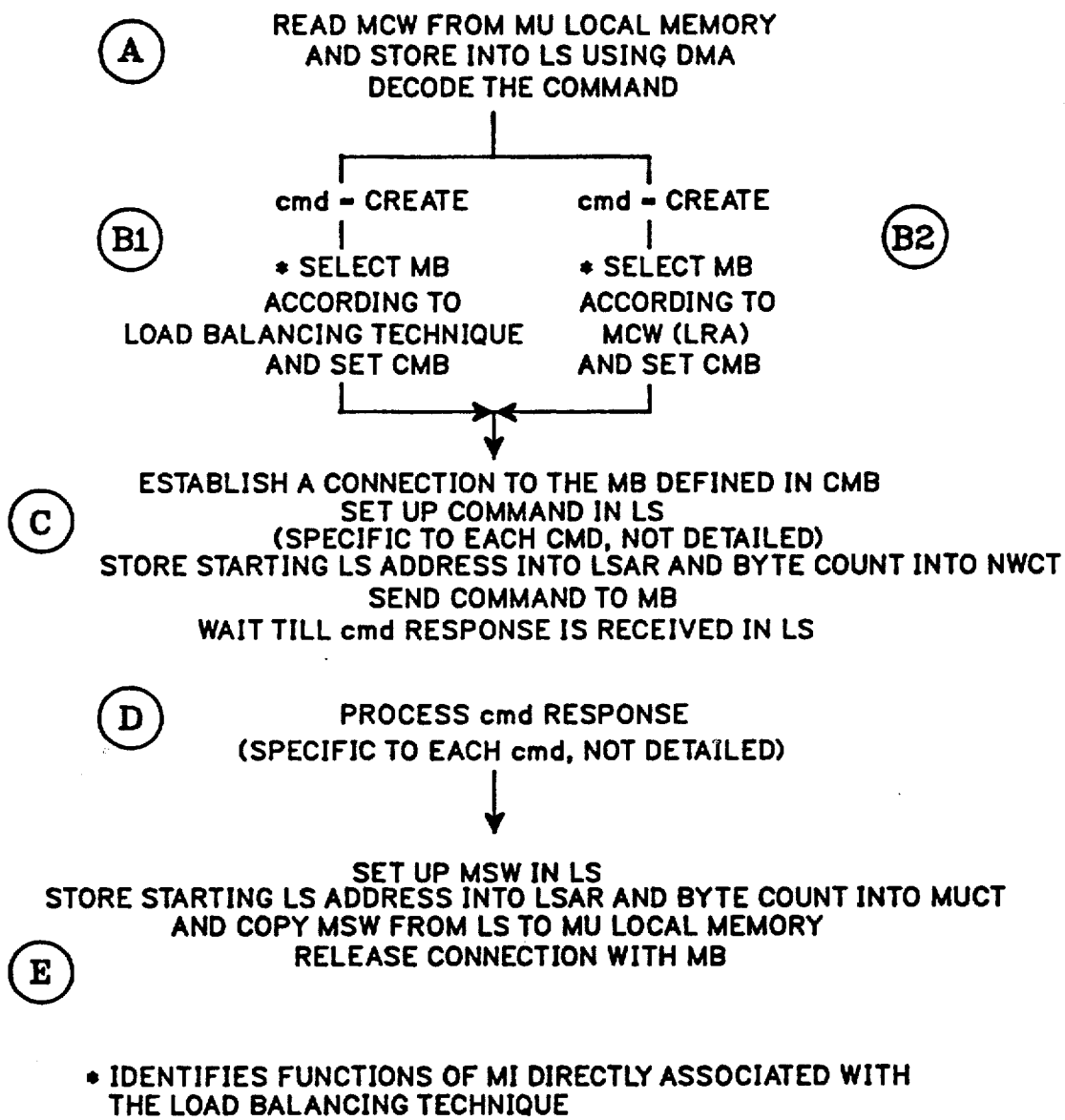
FIG. 7 is a flow diagram of the memory command processing in the memory interface logic.

The flow diagram of FIG. 7 illustrates the steps which are executed during command processing in the memory interface (MI) logic. In particular, it shows how the memory utilization (memory load status) information which is an important part of the load balancing technique, is handled during the processing of memory commands, but this is not essential for the present invention.

Step A: The MI reads the memory control word MCW from the user's local memory LM(91) (using DMA techniques) and stores the MCW in its own local storage LS. It then decodes the command. Depending on the fact whether the command is a CREATE command or not, one of two different steps is taken next.

Step B1 (Cmd = CREATE): One of the memory banks is selected according to the load balancing technique (selection described in Section 7). A CMB variable designating the current memory bank (explained below) is set up.

Step B2 (Cmd = other than CREATE): The memory bank MB to be used for this command is determined by the LRA field of the MCW. Cf. remarks in Section 7b below. A CMB variable (designating current memory bank) is set up.

Step C: The MI establishes a connection through the interconnection network NW to the memory bank designated by the current CMB. A command is set up in local storage LS (no details given here because this is not essential to the invention. The starting address of the command in LS is entered into LSAR, and the byte count of the command is loaded into register NWCT. Then the command is sent to the selected memory bank MB. Returning of a command response from the MB is awaited.

Step D: The command response, when received in the MI, is processed (no details given here because this is not essential to the invention).

Step E: Now the MI sets up the memory status word MSW in its local storage LS (using the information received with the command response). It then loads the LS address where the MSW starts into the LSAR and the byte count of the MSW into the counter MUCT, and copies the MSW from the LS into the user's local memory. Finally, the connection through the interconnection network to the MB is released.

7. Selection of a Memory Bank by the Memory Interface

There are two different situations when a memory interface MI has to select a memory bank MB for executing a memory command: (a) for a CREATE command, a new memory bank has to be selected; (b) for all other memory commands the memory bank is known (from the LRA parameter) and the MI can just identify this MB.

a) Selection of an MB According to the Load Balancing Technique

The selection of a memory bank MB for creating a new record is preferably done by the load balancing technique which utilizes the knowledge about memory load status which is available in each memory interface MI as explained before.

b) Selection of a MB When the LRA is Known, e.g. For Commands Other Than Create The LRA which is returned by the MB on a CREATE command is a 32 bits identifier in which bits 8, 9 and 10 contain a code specifying the MB (000 identifies MB number 0; 001 identifies MB number 1; etc.).

Therefore, the MI logic knows which MB it has to establish a connection to.

Selecting a MB for commands other than CREATE consists in identifying the LRA field in the MCW (which has just been copied in LS during the previous create command), extracting bits 8 to 10 out of it, translating this three bits code into the eight bits format used in the CMB and loading the resulting value into the CMB. This is done by very simple hardware, not further described.

8. Structure of the PMCE

Figure 10:
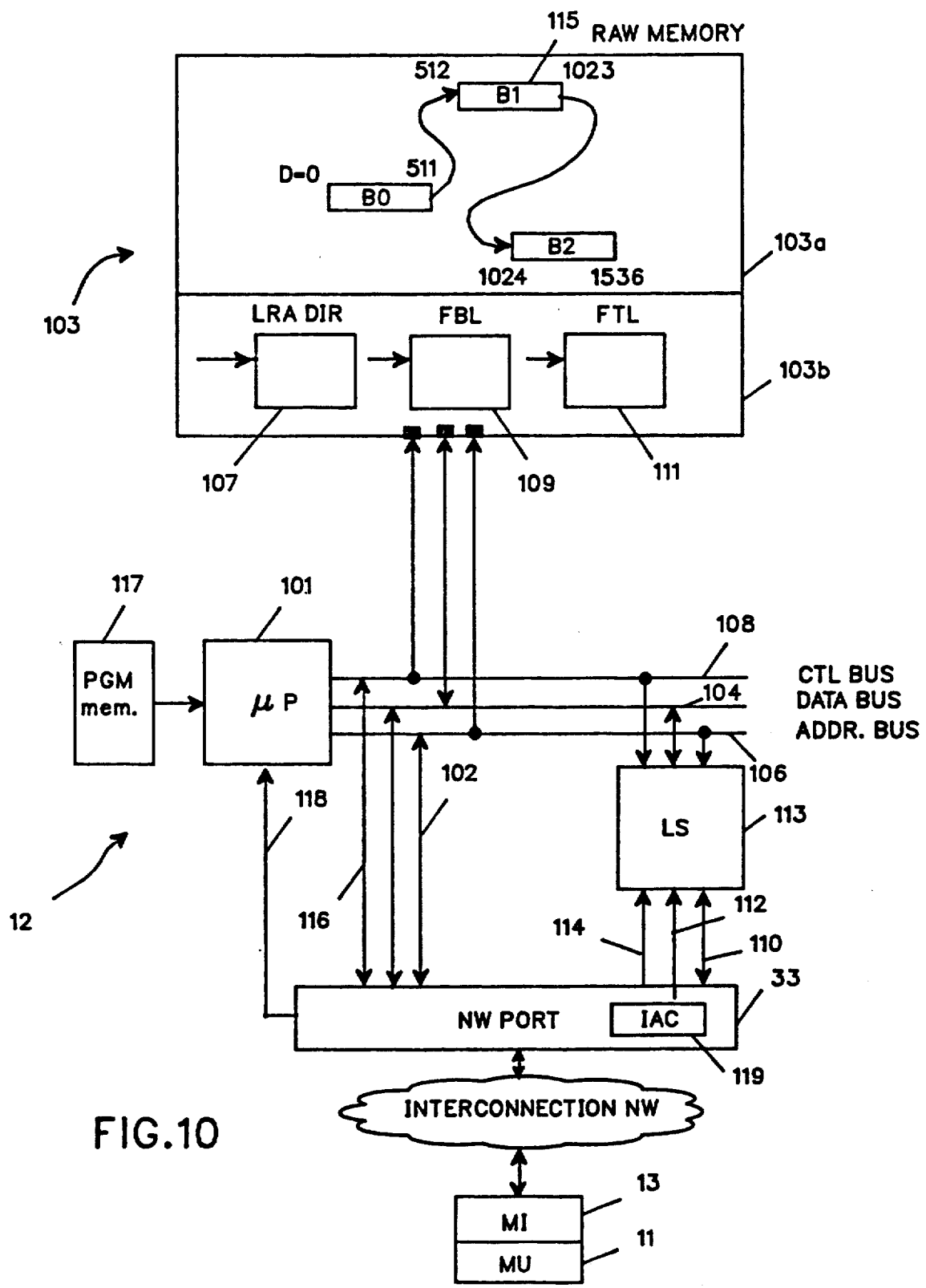
FIG. 10 is a block diagram of the Packet Memory Command Executor and data memory in a Memory Bank.

FIG. 10 shows the overall structure of the PMCE (12) and of the data memory (103) section or RAW MEMORY, of a memory bank.

A memory user MU(11), memory interface MI(13), interconnection network NW(15) and network port (33) similar to the one described in relation to FIG. 6, are also schematically represented to show the link between the data memory (103), PMCE (12), and the rest of the device shown in FIG. 1.

The PMCE basically comprises a microprocessor (101) for processing the high level commands provided by a memory user, the processing being done by microprograms located in a program memory (117). The steps of the command-depending microprograms will be detailed later.

The PMCE(12) further comprises a local storage unit LS(113) connected to the data bus (104), address bus (106) and control bus (108) of the microprocessor (101). The same busses are provided in parallel to the data memory (103) and to the network port (33). The local storage unit LS(113) is in fact a two-ports memory, connected by its second port to the network port (33), through a data bus (110), an address bus (112) and a read/write command lead (114). Finally, the NW port (33) includes an input address counter IAC (119) the status of which will be read by the microprocessor (101) through lead (116).

Given this structure, the operation of the PMCE(12) will now be described.

9. Operation Principle of the PMCE

When a memory user MU(11) sends a high level command through MI(13), NW(15) and NW Port (33) to the local storage unit (113), this command is provided on data bus (110), and written into LS at an address specified by address bus (112). If the transmitted high level command is a PUT command for instance, including a 12 bytes command header, and N data bytes to be transferred to data memory (103), the header, which includes a command identifying code, is directly transmitted to the microprocessor (101) on bus (102). Thus, the microprocessor (101) is alerted that he has a high level command to process and said command header is decoded to determine which high level command has been received. If it is a PUT, the N data bytes are transmitted by the NW port (33) (acting as a slave port, unlike the NW port described in relation to FIG. 6) and the busses (102) and (104) to the local store LS(113).

Meanwhile, the number of bytes received by LS(113) is counted by Input Address Counter IAC(119), and if a determined number of bytes, sufficient to fill a data memory buffer(115), has been transmitted, the microprocessor (101) is informed through command lead (118). This causes the microprocessor to begin the transfer of the received data bytes stored in LS(113), towards the data memory (103). If the high level command is a PUT for instance, the microprocessor will read from the LS (113) the N data bytes accompanying the PUT command, through busses (104, 106, 108) and transfer the data into the data memory (103), at an address corresponding to the logical record address specified in the PUT command. The physical address of the buffers (115) where the data bytes will be stored in data memory (103) are determined by an address translation mechanism determining the physical buffer addresses, starting from the knowledge of the logical record address. This translation mechanism is described farther.

It is to be noted that an End Of Command (EOC) delimiter is also awaited, and when it is decoded within the NW port (33) before the Input Address Counter IAC(119) has counted enough bytes to fill a data buffer, the data bytes of the command, which are stored in LS(113), are nevertheless transferred to data memory (103) by the microprocessor (101), the latter being signalled of the arrival of EOC by the NW port (33), through lead (118). The event of detecting EOC before the normal activation of lead (118) by IAC (119) simply means that there are not enough data bytes in the PUT command (stored in LS), to fill entirely a data buffer (115) of 512 bytes of data memory (103).

Once the data bytes included in the PUT command have been transmitted to data memory (103), the microprocessor stores a command response (the format of which is shown in FIG. 4A) into LS(113), and asks (through control busses (103, 116)) the memory user MU(11) to get the command response from the local store LS(113).

It is to be noted that the operation of the PMCE(12) elements as described in relation to a PUT command is very similar in the case of a GET command, for which the flow of the data bytes is inverted. Therefore, the operation of the PMCE for a GET command is not fully described and can easily be deduced form the description related to the PUT command.

Further, the PMCE operation for a CREATE or a RELEASE command, which do not imply a transfer of data bytes, will simply be summarized farther (section 11).

10. Structure of the Data Memory

The data memory (103) includes a first section (103a) containing data buffers (one buffer having for instance a 512 bytes content), and a second section (103b) including memory management tables (107, 109, 111). Said memory management tables include a logical record directory (107) with one entry per LRA, and in this entry all information needed to point to the physical address corresponding to any displacement value in a record is provided. The memory management tables also include a free buffer list (109) and a free token list FTL(111), all implemented by RAM memories. In a typical implementation of the invention, the memory space used for LRA directory (107), FBL(109) and FTL(111) is about 5% of the global data memory (103).

The structure and use of LRA directory (107), FBL(109) and FTL(111) will now be described, in relation to the relevant high level commands using said devices.

Figure 11A:
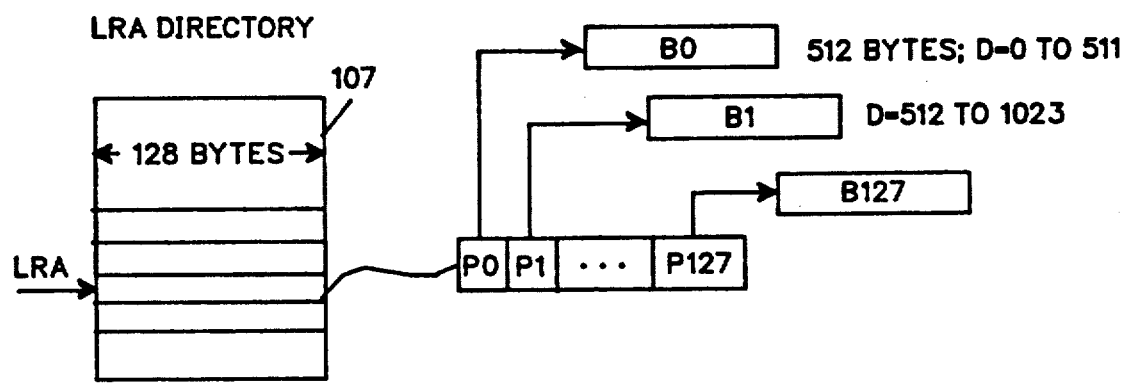
FIG. 11A is a schematic representation of a LRA directory used for logical to physical address translation.

The LRA directory (107), as shown in FIG. 11A is used for the logical to physical address translation.

In the case of Class 1 records, containing a maximum of 64K bytes of data, or 128 buffers of 512 bytes, the LRA directory (107) contains, for each LRA, a pointer PTR. This pointer PTR comprises 128 elementary pointers P0 to P127 of one byte each, giving the physical address of buffers B0 to B127, which is in fact the physical address of their first byte.

Thus, the first pointer P0 corresponding to buffer B0 (also shown in FIG. 10), also corresponds to displacements D=0 to D=511 in the Logical Record Address LRA, the second pointer P1 corresponds to displacements D 512 to 1023 in the LRA, etc. . . .

It results that, for a byte of information defined in high level command by a Logical Record Address LRA and a displacement D, the physical address of the byte of information in a buffer would be given by the rest of the division of the displacement D by 512 (a buffer length), the dividend being the rank of the buffer pointer P0 to P127.

Besides, it is to be noted that a buffer pointer Pi (i=0 to 127) equal to byte 00000000 means that no buffer has been allocated to support the corresponding displacements.

Figure 11B:
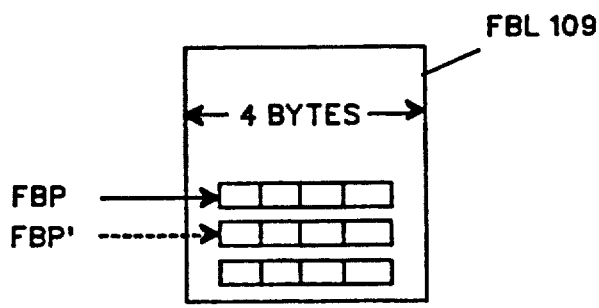
FIG. 11B is a schematic representation of a Free Buffer List FBL shown in FIG. 10.

The free buffer list FBL(109) is used for buffer allocation, and is described in relation to FIG. 11B. If the content of a memory bank is 4 megabytes, partitioned into buffers of 512 bytes, the free buffer list will contain 8000 free buffers at initialization. The addresses of those 8000 buffers are given by 4 bytes words of address, and the FBL will have a size of 32K bytes, during operation.

The address of the first free buffer is given by a free buffer pointer FBP, which points to the address of the buffer which will be allocated by the next buffer allocation to a record. Once this buffer has been allocated, the pointer moves into position FBP', pointing at the address of the next free buffer in data memory (103). Consequently, the address of previously allocated buffers (which are now busy), do no longer exist in the FBL, which avoids allocating a given buffer twice. It is to be noted that, according to the invention, the physical data buffers B1, B2, B3, . . . corresponding to a given high level command may be located anywhere in the data buffers section (103), the only rule being that said buffers must be free when they are allocated to a determined user.

Figure 11C:
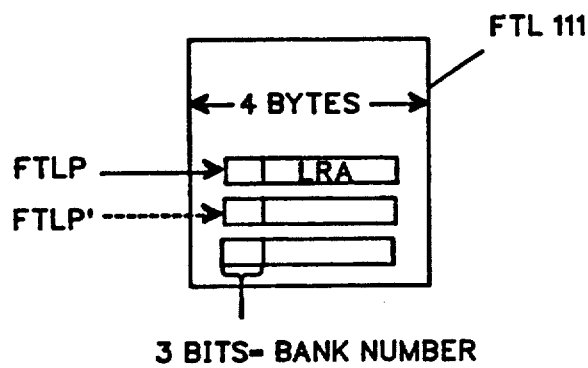
FIG. 11C is a schematic representation of a Free Token List FTL shown in FIG. 10.

The free token list FTL(111) is used for allocation of logical addresses (or tokens) to records, and is described in relation to FIG. 11C. The FTL(111) is a piece of memory containing a pile of the 4 bytes logical record addresses that are free at a given moment. The size of the FTL(111) in bytes is given by the bank size (in bytes) divided by the minimum number of bytes in a record (512 bytes, or one buffer size) and multiplied by four, since a LRA is spread over 4 bytes.

The first free LRA of the pile is pointed at by a Free Token List Pointer (FTLP). When a new LRA is needed, for instance for a CREATE command, the LRA pointed at by FTLP is read and affected to the new record to be created. Then the FTLP is updated by FTLP' and displaced to the new top of the LRA pile.

It is to be noted that a LRA has to be unique for the whole shared memory, to avoid that a given LRA could be given to several physical records. Therefore, the first 3 bits of each free LRA stored in FTL(111) indicate a memory bank number (1 out of 8), and the rest of the 4 bytes identify a Logical Record Address in a given bank.

11. Execution of the High Level Commands by the PMCE

Given the structure of the PMCE(12) and data memory (103), as previously described, the steps of the routines performed by the microprocessor (101) for execution of the high level commands will now be summarized.

CREATE COMMAND

1. Allocate a Logical Record Address LRA to the record to be stored in memory.
2. Set up a response word (cf. FIG 4A) containing said LRA, and transmit it to Network Port (33).
3. Start network port (33) which causes the response word to be sent to the memory user MU.
4. Exit.

RELEASE COMMAND

It is to be noted that the Release Command must release a LRA itself, and all the physical memory buffers affected to it. As explained in relation to FIG. 11A, a busy buffer is recognized by its pointer Pi (i=0 to 127) different from byte 0 (e.g. containing eight zeros). Thus, to release all the buffers, it is necessary to write 0 bytes into all pointers Pi of the 128 bytes pointer addressed by LRA. And to release the LRA, it is necessary to add said LRA on top of the Free Token List (111) (cf. FIG. 11C). The steps are summarized hereunder:

1. Accede to LRA directory, using the LRA to release.
2. Release all buffers allocated to LRA, by writing Pi=0 for all Pi, into LRA directory, at address pointed at by LRA.
3. Write LRA on top of Free Token List (111), which renders subject LRA free for an affectation to a new record.

PUT COMMAND

It provides a LRA, a Displacement, and N bytes of data to transfer. Its steps are summarized thereunder:

1. Translate LRA and D into physical address.
2. Test if buffers have been allocated to LRA. (e.g.: Pi≠all 0)
   2.a. if no, allocate buffers to LRA.
   2.b. if yes, test IAC(119), or EOC
   This checks (IAC) if enough data bytes are present in LS (113), or if all the data bytes corresponding to the PUT command are present there (EOC).
3. Move all data bytes from LS(113) into buffers previously allocated.
4. Update D into D', where D'=displacement of the first byte of next buffer of the record specified by LRA.
5. Test if EOC received:
   5.a. if no, go to 1. for translation of (LRA, D') into physical address.
   5.b. if yes, generate in LS(113) a 5 bytes response word to PUT command.
6. Start MW port (33) for transmission of response to memory user.
7. Exit

GET COMMAND

It provides a LRA, a Displacement D, and the number N of bytes to get from data memory (103). The steps performed are:

1. Translate LRA, D into physical address.
2. Test if physical address corresponds to at least an allocated buffer.
   2.a if no, generate an error indication, since the buffers should have been allocated by a previous CREATE command.
   2.b. if yes, go to 3.
3. Move one buffer from data memory into local store LS(113).
4. Update displacement D→D'.
5. Test if data byte count exhausted:
   5.a. if no, go to 1 (D' has to be translated into physical address).
   5.b. if yes, generate a 5 bytes command response word to the GET command.
6. Start NW Port (33) for transmission of response to memory user.
7. Exit.

We claim:

1. A device for interconnecting processors of a plurality of memory users MU linked through an interconnection network NW to a shared memory PM comprising a plurality of memory banks MB defining a globally shared memory space, said device comprising:
   means for presenting to said memory banks MB through said network NW a set of high level commands issued by the memory users MU for storing and retrieving records into or from said memory space, said high level commands utilizing only logical addresses (LRA) of said records, and
   means, physically integrated in each memory bank MB, for retrieving the physical addresses of said records according to their logical addresses LRA and executing said high level commands, and wherein,
   said means for presenting to said memory banks a set of high level commands, comprises a plurality of memory interfaces MI dedicated to their respective users MU, a given memory interface MI processing each command request from its associated memory user MU by executing the steps of:
   (a) reading a memory control word MCW including a high level command and a logical address from a user's local memory LM;
   (b) decoding said high level command;
   (c) selecting independently one of the memory banks MB;
   (d) establishing a connection through the interconnection network NW to the selected memory bank MB;
   (e) sending the high level command including said logical address to said selected memory bank MB; and
   (f) releasing the connection to said memory bank MB upon receipt of a command response (MSW) from the memory bank MB.

2. A device according to claim 1, wherein said means for retrieving the physical addresses of said records and for executing said high level commands comprises a plurality of subsystem Packet Memory Command Executors PMCE connected and dedicated to their respective memory banks each subsystem PMCE for executing said high level commands sent by a Memory User through a Memory Interface comprises a microprocessor for processing the high level commands and a local storage unit LS for storing said high level commands, said processing being done according to command-depending microprograms located in a program memory associated with said microprocessor.

3. A device according to claim 2, wherein said means for retrieving the physical addresses of said records according to their logical addresses (LRA) and executing a specific high level commands, include a data memory containing:
   a plurality of fixed size data buffers;
   a Logical Record Address Directory for translating a Logical Record Address (LRA) used as a pointer to said directory, into a number of elementary pointers corresponding to a number of physical addresses of data buffers allocated to a record having (LRA) as logical address;
   a free buffer list FBL wherein a list of data buffers not allocated to a record, is maintained,
   a free token list FTL wherein a list of the logical record addresses (LRA) not affected to a record, is maintained.

4. A device according to claim 3, wherein said set of high level commands includes a CREATE command, which, when sent by a memory user MU and memory interface MI to a memory bank MB and executed therein by the corresponding PMCE, comprises the steps of:
   creating within said memory bank a new record uniquely identified in the Shared Memory PM by a Logical Record Address (LRA) and,
   returning said Logical Record Address (LRA), in a command response word, to the respective memory interface MI and memory user MU, thus enabling the latter to process the created record by using the logical address (LRA) independently of the physical location of the record in memory.

5. A device according to claim 3, wherein said set of high level commands includes a PUT command defined by a command code, a Logical Record Address (LRA), a displacement (D), and a variable number N of data bytes to put into data memory after displacement D, said PUT command, when sent by a memory user MU and memory interface MI to a memory bank MB and executed therein by the corresponding PMCE, causing the steps of:
   allocating to the record specified by the LRA the number of physical data buffers needed to contain the data bytes attached to the specific PUT command;
   storing said N data bytes into said data buffers;
   establishing within said memory bank, a LRA directory having one entry per LRA and a given entry including all the elementary pointers for addressing the physical data buffers at a location corresponding to displacement D.

6. A device according to claim 3, wherein said set of high level commands includes a GET command defined by a command code, a logical record address (LRA), a displacement D, and a number N of data bytes contained in a data memory, said GET command, when sent by a memory user MU and memory interface MI including an LRA directory having pointers for addressing physical memory buffers, to a memory bank MB and executed therein by the corresponding PMCE, causing the steps of:

pointing with the LRA to said LRA directory for retrieving said physical addresses of said physical data buffers including said N data bytes after said displacement D;

reading said N data bytes;

carrying said N data bytes back from said physical data buffer to said memory interface MI and memory user MU.

7. A device according to claim 3, wherein said set of high level commands includes a RELEASE command defined by a command code and a Logical record address (LRA), said RELEASE command, when sent by a memory user MU and memory interface MI including an LRA directory having pointers for addressing physical data buffers, and a free token list FTC to a memory bank MB and executed therein by the corresponding PMCE, causing the steps of:

cancelling the specified logical record address (LRA) from said LRA Directory of the considered memory bank;

releasing all physical data buffers pointed at by the content of said specified LRA and, updating the free LRA token list in said FTL.

* * * * *